United States Patent Office 3,258,420
Patented June 28, 1966

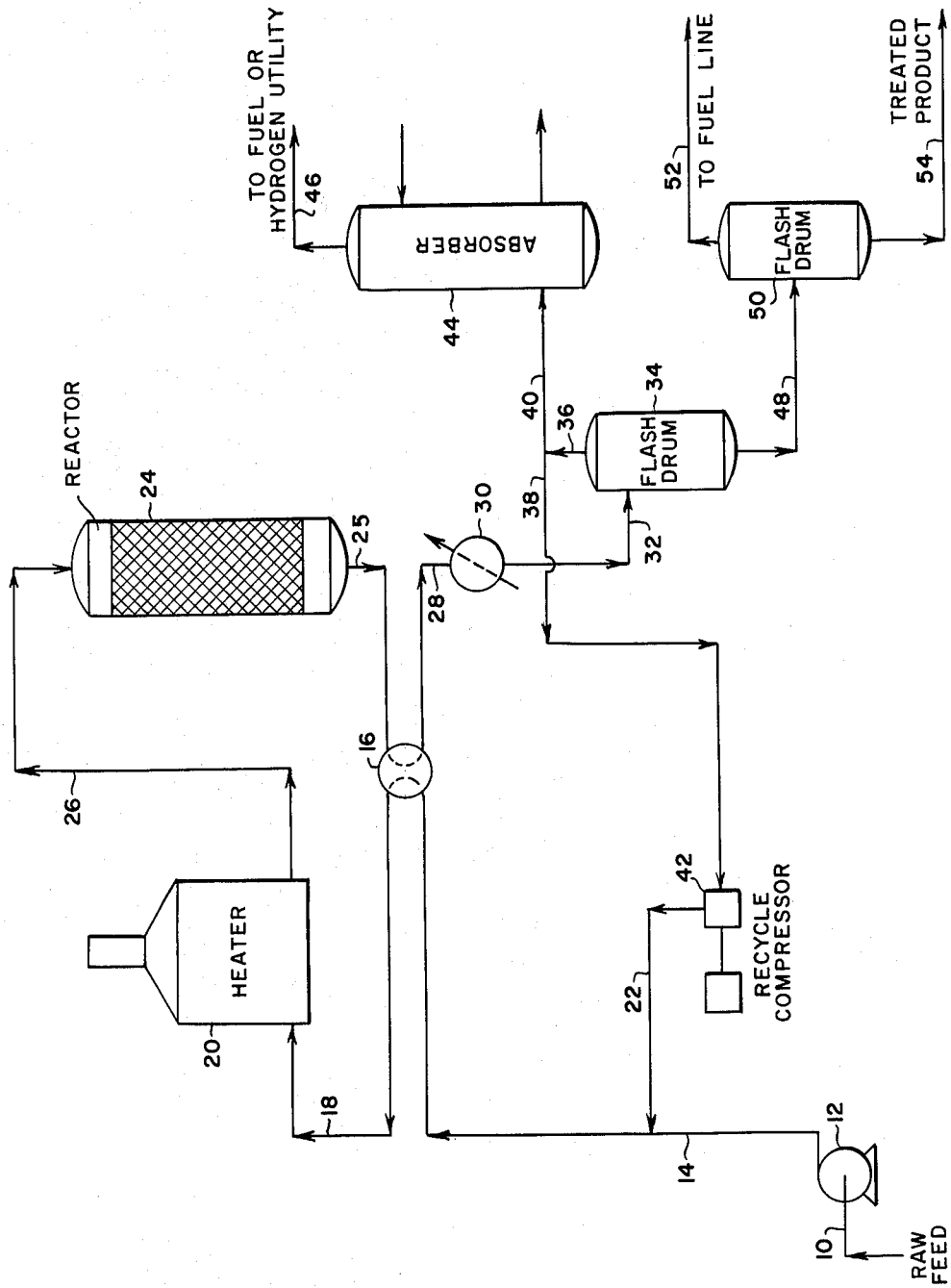

3,258,420
REFORMING WITH OPTIMIZATION OF
HYDROGEN PRODUCTION
Milton H. Dalson, Lincolnshire, Crete, and William H. Decker, Chicago, Ill., assignors to Sinclair Research, Inc., New York, N.Y., a corporation of Delaware
Filed May 7, 1962, Ser. No. 192,876
6 Claims. (Cl. 208—138)

This invention relates to the catalytic reforming of hydrocarbons. More specifically this invention relates to an improved method of operation of a catalytic reforming system, preferably a single reactor reforming system.

It is known in the art to conduct a reforming process by contacting a hydrocarbon, for instance a naphtha fraction, with a reforming catalyst such as a platinum metal catalyst under conditions of elevated temperature and pressure in order to enhance the octane rating of the naphtha fraction so that it is more suitable for gasoline blending. The most widely practiced catalytic reforming process carried out in accordance with fixed bed technique requires at least 3 reactors in series with varying quantities of catalyst in each of the reactors. Such systems are usually designed for the reforming of a particular naphtha fraction and the operating conditions employed include a temperature from 800–850° F. up to temperatures above 1000° F., pressures in the range of about 300 p.s.i.g. and above, a weight hourly space velocity from about 1 to about 5 and mole ratios of hydrogen to naphtha fraction of 4 or 5:1 up to about 10 or 20:1 or even higher. In such systems there is the problem of rapid catalyst aging and uneven catalyst aging. While the employment of a plurality of reactors with interheating does tend to offset the catalyst aging problem to some extent, there is inherent in the multiple reactor system the high capital investment in equipment necessitated by the plurality of the reactors. Furthermore, such reforming systems having a capacity of, for example, 10,000 barrels per day normally require a catalyst inventory in the range of about 35,000 to 40,000 pounds of a supported platinum metal catalyst. The high initial capital investment required by such an extremely large catalyst inventory is obvious. Moreover, the practice has been followed to provide an alternate or swing reactor which can be placed on stream when one of the other reactors is taken off stream in order to regenerate the catalyst. The use of such a swing reactor requires a rather complicated system of piping so that the reactor containing the freshly regenerated catalyts can always be maintained in the same sequence in the series regardless of the spatial relation of the reactor containing the freshly regenerated catalyst and the other reactors in the system. The increased cost of the rather complicated system of piping together with the large number of valve changes required to take the reactor off stream, put another reactor on stream in its proper sequential position, and purge, regenerate, purge, and place on stream again, and the chance for mechanical or human failure during the change from on stream to regeneration to on stream dictates that such regenerations be kept to a minimum, or in other words that the catalyst life be maximized.

It has been proposed in U.S. Patent No. 3,002,918 that catalyst life can be increased and, therefore, the amount of down time required for catalyst regeneration can be decreased in a multiple reactor reforming system by operating with a hydrogen to naphtha mole ratio of at least 30, a pressure of less than 400 p.s.i.g. and a liquid hourly space velocity of about 1. While such suggested process may increase catalyst life, it still perpetuates the undesirable features of requiring a large capital investment for the plurality of reactors together with the maintenance of an extremely large catalyst inventory. Such proposed system also requires extremely large quantities of hydrogen for operation as indicated by the hydrogen to naphtha ratio of at least 30.

In this connection it must be mentioned that one of the problems confronting the entire chemical process industry today is the high cost of obtaining high purity hydrogen. Compounding this problem is the fact that the requirements for high purity hydrogen are ever increasing. It has even been estimated that the hydrogen consumption in this country will double during the course of the next five years. Inasmuch as the presently known sources of low cost hydrogen are being exploited to their maximum, it appears that the problem will worsen as time goes on rather than lessen. Specifically, the petroleum refining industry is confronted with the problem of increasing requirement for hydrogen consuming processes, i.e., hydrogenation, hydrocracking, etc., together with optimization of yields without increasing the cost of operation of such processes.

In accordance with our invention we provide a low pressure-high space velocity-low recycle ratio method for catalytically reforming a hydrocarbon fraction boiling in the range from about 90° to about 450° F. while optimizing production of relatively high purity hydrogen. Our method comprises charging a mixture of a hydrogen-rich gas and a hydrocarbon fraction boiling in the range from about 90° to about 450° F., or any subfraction thereof, to a reaction zone containing a fixed bed of a carrier-based platinum metal reforming catalyst under reforming conditions including a temperature from about 900° to about 980° F., a pressure from about 150–250 p.s.i.g., a weight hourly space velocity from about 15 to about 30, and a mole ratio of hydrogen-rich gas to hydrocarbon fraction from about 2:1 to about 4:1. Preferably, the method of our invention is conducted in a single reactor.

It will be noticed that the operating conditions employed in the method of our invention are significantly different from those suggested in the prior art. Essentially the unique combination of processing conditions in accordance with our invention can be characterized as low pressure (150 to 250 p.s.i.g. rather than 300 p.s.i.g. and above), high space velocity (15 to 30 rather than 1 to 5), and low recycle ratio of hydrogen to hydrocarbon (2 to 4:1 rather than ratios of 10, 20 and even 30:1).

In addition to producing high purity hydrogen the method of our invention also minimizes the initial capital expenditure required for the establishment of a catalytic reforming system of a given charge capacity and minimizes the operating costs of such a system. Further, the method of our invention greatly increases catalyst life.

From another aspect not only is our method economically advantageous in that substantial quantities of low cost high purity hydrogen are produced which can be employed in hydrogen consuming processes but also the method of our invention requires a minimum quantity of hydrogen recycle. Furthermore, our method also results in the low cost production of extremely desirable aromatic products. Another advantage of our method is that the octane enhanced reformate is essentially sulfur free which improves tetraethyl lead susceptibility thereby making it a more suitable gasoline blending component.

The hydrocarbon fraction employed as charge stock in the method of our invention can be, for example, a full boiling range naphtha stock or it can be a light or heavy straight run naphtha fraction. While the method of our invention is operable within the broad range of conditions set forth above, the operating conditions for any specific service can be varied in accordance with the feedstock and the desired product quality. For example, if high purity hydrogen production is required, then a temperature of about 900° F., a pressure of about 150 p.s.i.g., a weight hourly space velocity of 25 and a mole ratio of hydrogen to hydrocarbon fraction of about 2:1 would be employed with a high naphthene content straight run naphtha containing about 45 to 55% naphthenes.

The reforming reaction of our method can be conducted in any single reforming reactor of the types well known in the art, which can be either adiabatic or isothermal. Due to the fact that catalyst utilization is limited by the endothermicity of the reaction it is advantageous to employ an isothermal reactor such as the type described in U.S. Patent No. 2,943,998, of W. H. Decker, and, preferably, an isothermal reactor of the type described in application Serial No. 192,856, filed May 7, 1962, of W. H. Decker.

Any of the well known reforming catalysts can be employed in the method of our invention. For instance, we find it advantageous to employ catalysts which consist essentially of a carrier-based platinum group metal and generally have a platinum group metal content of 0.1 to 2% by weight. Suitable carriers are of the refractory oxide type and include alumina, especially activated alumina, silica, boria, zirconia, magnesia and combinations of these refractory oxides. Preferred carriers contain alumina alone or as the major component and can include components which react with alumina to form an acidic catalyst, such as chlorine, silica, boria and the like. The platinum group metal of the catalyst is the essential ingredient and these metals include for instance platinum, palladium, rhodium and iridium. A particularly advantageous catalyst which can be employed in the process of our invention is a supported platinum catalyst containing for instance about 0.3 to 1.0% by weight platinum and the support is alumina characterized for instance by high surface area and enlarged pore size. Such catalysts can be conveniently prepared as described in U.S. Patents Nos. 2,838,444 and 2,838,445.

In order to illustrate the method of our invention more clearly, reference is made to the following examples, which should be read in connection with the attached drawing.

EXAMPLE I

In this example a low octane light straight run naphtha stock is employed. The inspection of this stock is shown in Table I.

*Table I*

Stock _____ Light straight run naphtha
ASTM distillation:
    Gravity, ° API _____ 77.2
    IBP, ° F. _____ 96
    10%, ° F. _____ 119
    50%, ° F. _____ 144
    90%, ° F. _____ 185
    EP, ° F. _____ 211
    RVP, lbs. _____ 10.35

Inspections:
    Sulfur, wt. percent _____ 0.013
    Arsenic, p.p.b. _____ 5
    Lead, p.p.b. _____ 4
    Nitrogen (total), wt. percent _____ 0.000
    Nitrogen (basic), wt. percent _____ 0.0000
    Motor Method, clear _____ 68.2
    Motor Method+3 cc. TEL _____ 86.6
    Research Method, clear _____ 68.4
    Research Method+3 cc. TEL _____ 86.1
Component analysis:
    Isobutane, vol. percent _____ 0.02
    n-Butane, vol. percent _____ 2.73
    Isopentane, vol. percent _____ 12.77
    n-Pentane, vol. percent _____ 19.40
    Methylcyclopentane, vol. percent _____ 7.65
    Cyclohexane, vol. percent _____ 4.45
    Dimethylcyclopentanes, vol. percent _____ 3.90
    Methylcyclohexane, vol. percent _____ 2.60
    Ethylcyclopentanes, vol. percent _____ 0.17
    Benzene, vol. percent _____ 0.68
    Toluene, vol. percent _____ 0.54
    $C_6+$ paraffins, vol. percent _____ 45.09

A stream of this charge stock is passed by means of line 10, pump 12, line 14, through heat exchanger 16 and line 18 into heater 20. This stream flows at the rate of 10,000 barrels per day. Prior to entering heat exchanger 16, the charge stock stream of line 14 is admixed with a stream of hydrogen-rich recycle gas introduced by means of line 22 at the rate of 3 moles of hydrogen per mole of charge stock. This mixed stream is raised to a temperature of about 700° to about 850° F. in heat exchanger 16. The mixed stream of line 18 is further heated to the desired reforming temperature in heater 20 and then passed to reactor 24 by means of line 26. The reforming inlet temperature employed in each of the tests of this example is given in Table II, below. In reactor 24 the mixed stream is contacted with a 7380 pound quantity of a fluoride-free platinum-alumina catalyst produced in a commercial plant which manufactures the catalyst of U.S. Patent 2,838,444 containing approximately 0.7 weight percent platinum in the form of one-sixteenth inch extrudate at a pressure of 200 p.s.i.g. and a weight hourly space velocity of 15.

The reformate effluent is removed from reactor 24 by means of line 25 and then passed to heat exchanger 16 where it is employed to heat the incoming charge stock. The reformate is then passed by means of line 28 to cooler 30 where it is cooled to about 100° F. From cooler 30 the reformate is passed by means of line 32 to flash drum 34 where the reformate is separated into a liquid stream and a hydrogen-rich gas stream. The hydrogen-rich gas stream is removed from flash drum 34 by means of line 36 and is then split into lines 38 and 40. As shown in the drawing, the hydrogen-rich gas stream of line 38 is passed to recycle compressor 42 where it is compressed to reforming pressure and is then introduced into the charge stock stream of line 14 by means of line 22. The hydrogen-rich gas stream of line 40 is introduced into absorber 44 where it is treated for butane and pentane recovery. The net hydrogen produced by the system is removed from absorber 44 by line 46 and then passed to hydrogen utilization, not shown.

The liquid stream from flash drum 34 is removed by means of line 48 and introduced into a second flash drum 50 where such stream is separated into a gas stream consisting mainly of butanes and propane and a liquid stream. The gas stream is removed from flash drum 50 by means of line 52 and the liquid stream is removed by means of line 54 and passed directly to gasoline blending to product recovery means, not shown.

The particular operating conditions employed in the tests of this example are selected to maximize both the quantity and purity of the hydrogen product and are set forth in Table II together with inspections of the products obtained.

Table II

| Test | 1 | 2 | 3 |
|---|---|---|---|
| Operating Conditions: | | | |
| Temperature,[1] °F | 920 | 940 | 960 |
| Pressure, p.s.i.g | 200 | 200 | 200 |
| Space Velocity, WHSV | 15 | 15 | 15 |
| Recycle Ratio, M/M | 3/1 | 3/1 | 3/1 |
| Product Inspections: | | | |
| Hydrogen, Wt. Percent | 0.97 | 1.06 | 1.18 |
| Dry Gas, Wt. Percent | 0.79 | 0.86 | 2.86 |
| Butanes, Vol. Percent | 3.77 | 3.46 | 5.47 |
| $C_5$ EP Gasoline, Vol. Percent | 92.80 | 92.71 | 88.24 |
| $C_5$ EP Gravity, °API | 73.5 | 73.0 | 72.0 |
| $C_5$ EP RVP, Lbs | 9.64 | 9.98 | 9.65 |
| $C_5$ EP Research Clear Octane | 73.4 | 75.2 | 77.8 |
| $C_5$ EP Research Octane plus 3 cc. TEL | 91.4 | 92.5 | 95.4 |
| $C_6$ EP Paraffins, Vol. Percent | 60.6 | 58.2 | 56.8 |
| $C_6$ EP Naphthenes, Vol. Percent | 12.0 | 11.7 | 8.6 |
| $C_6$ EP Benzene, Vol. Percent | 11.7 | 13.1 | 17.5 |
| $C_6$ EP Toluene, Vol. Percent | 11.7 | 12.6 | 14.4 |
| $C_6$ EP Xylenes, Vol. Percent | 2.8 | 3.1 | 2.5 |
| $C_6$ EP $C_9+$ Aromatics, Vol. Percent | 1.2 | 1.3 | 0.2 |
| Operation: | | | |
| Hydrogen Yield, $\overline{M}$ s.c.f./d | 4.36 | 4.77 | 5.31 |
| Hydrogen Purity, Mol. Percent | 95.7 | 94.3 | 93.8 |
| $C_5$ EP Gasoline, b.p.d | 9,280 | 9,271 | 8,824 |
| Benzene, b.p.d | 671 | 768 | 929 |
| Toluene, b.p.d | 671 | 739 | 764 |

[1] Reactor inlet temperature.

From the data presented in Table II it can be seen that the combination of the unique conditions of low pressure, high space velocity and low recycle ratio in accordance with the method of our invention result not only in low cost high purity hydrogen but also in the production of substantial quantities of benzene and toluene. If aromatics production is not required, the aromatic products can be carried through to gasoline blending which will result in significant reduction in the tetraethyl lead requirement of the finished gasoline stream.

EXAMPLE II

In this example a select $C_8$ rich fraction derived from straight run naphtha is employed as the charge stock. The inspection of this stock is set forth in Table III.

Table III

Stock _____ $C_8$ rich fraction
ASTM distillation:
   Gravity, °API _____ 56.4
   IBP, °F. _____ 248
   10%, °F. _____ 254
   50%, °F. _____ 258
   90%, °F. _____ 268
   EP, °F. _____ 283
   RVP, lbs. _____ 0.65
Inspections:
   Research Method, clear _____ 47.8
   Research Method+3 cc. _____ 72.1
MSTA analysis ($C_6+$):
   Paraffins, vol. percent _____ 47.2
   Naphthenes, vol. percent _____ 44.5
   Benzene, vol. percent _____ 0.1
   Toluene, vol. percent _____ 0.2
   $C_8$ aromatics, vol. percent _____ 7.8
   $C_9$ aromatics, vol. percent _____ 0.1
   $C_{10}$ aromatics, vol. percent _____ 0.1

In a manner similar to that explained in Example I having reference to the attached drawing, the above-identified charge stock is processed under several different sets of operating conditions in accordance with our invention. The particular conditions employed are directed primarily to hydrogen production. The charge rate in this example is the same as that employed in Example I, i.e. 10,000 b.p.d. The catalyst and catalyst inventory is also the same, i.e. 7380 pounds of a 0.7% by weight platinum on alumina catalyst. The conditions employed in each of the tests of this example together with product inspections are set forth in Table IV.

Table IV

| Test | 1 | 2 | 3 |
|---|---|---|---|
| Operating Conditions: | | | |
| Temperature,[1] °F | 920 | 940 | 960 |
| Pressure, p.s.i.g | 200 | 200 | 200 |
| Space Velocity, WHSV | 15.0 | 15.0 | 15.0 |
| Recycle Ratio, M/M | 3/1 | 3/1 | 3/1 |
| Product Inspection: | | | |
| Hydrogen, Wt. Percent | 1.67 | 1.85 | 1.90 |
| Dry Gas, Wt. Percent | 0.51 | 0.79 | 1.15 |
| Butanes, Vol. Percent | 0.36 | 0.51 | 0.96 |
| $C_5$ EP Gasoline, Vol. Percent | 94.74 | 93.39 | 92.41 |
| $C_5$ EP Gravity, °API | 50.4 | 49.7 | 49.4 |
| $C_5$ EP RVP, Lbs | 1.4 | 1.1 | 1.4 |
| $C_5$ EP Research Clear Octane | 68.6 | 73.4 | 75.5 |
| $C_5$ EP Research Octane plus 3 cc. TEL | 85.7 | 88.6 | 90.1 |
| $C_6$ EP Paraffins, Vol. Percent | 47.6 | 46.5 | 45.6 |
| $C_6$ EP Naphthenes, Vol. Percent | 13.6 | 12.2 | 11.5 |
| $C_6$ EP Benzene, Vol. Percent | 0.3 | 0.3 | 0.3 |
| $C_6$ EP Toluene, Vol. Percent | 0.8 | 0.9 | 1.0 |
| $C_6$ EP Xylenes, Vol. Percent | 27.6 | 29.3 | 30.4 |
| $C_6$ EP $C_9+$ Aromatics, Vol. Percent | 10.1 | 10.8 | 11.2 |
| Operation: | | | |
| Hydrogen Yield, $\overline{M}$ s.c.f./d | 8.35 | 9.24 | 9.49 |
| Hydrogen Purity, Mol. Percent | 97.8 | 96.6 | 95.3 |
| $C_5$ EP Gasoline, b.p.d | 9,474 | 9,339 | 9,241 |
| Benzene, b.p.d | 28 | 28 | 27 |
| Toluene, b.p.d | 75 | 83 | 91 |
| Xylene, b.p.d | 2,596 | 2,714 | 2,763 |

[1] Reactor Inlet Temperature.

From the data in Table IV it can be seen that it is possible to produce substantial quantities of low cost high purity hydrogen while at the same time there is a significant production of desirable $C_8$ aromatics. The data of Table IV also indicate that hydrocracking is minimized as is evidenced by the fact that there is only a small amount of light ends such as butane and lighter components produced. The small quantity of benzene and toluene produced is also an indication of minimized hydrocracking (hydrodealkylation).

The above examples and other preliminary studies also indicate that long catalyst life—in excess of 50 barrels per pound—can be secured when operating under the unique combination of processing conditions in accordance with our invention.

We claim:
1. A method for catalytically reforming a hydrocarbon fraction boiling in the range from about 90°–450° F. while optimizing production of relatively high purity hydrogen which comprises charging a mixture of a hydrogen-rich gas and the hydrocarbon fraction to a reaction zone containing a fixed bed of carrier-based platinum metal reforming catalyst under reforming conditions including a temperature from about 900° to about 980° F., a pressure from about 150 to about 250 p.s.i.g., a weight hourly space velocity from about 15 to 30, and a mole ratio of hydrogen to hydrocarbon fraction from 2:1 to 4:1, and removing as a product from said reaction zone a stream containing relatively high purity hydrogen.

2. The method of claim 1 in which the hydrocarbon fraction is a light straight run naphtha boiling from about 90° to about 220° F., the temperature is about 920° to about 960° F., the pressure is about 200 p.s.i.g., the space velocity is about 15, and the mole ratio of hydrogen to hydrocarbon fraction is about 3:1.

3. The method of claim 1 in which the hydrocarbon fraction is a $C_8$-rich naphtha fraction boiling from about 240° to about 290° F., the temperature is about 920° to about 960° F., the pressure is about 200 p.s.i.g., the space velocity is about 15, and the mole ratio of hydrogen to hydrocarbon fraction is about 3:1.

4. The method of claim 1 in which the catalyst is platinum on alumina.

5. The method of claim 2 in which the catalyst is platinum on alumina.

6. The method of claim 3 in which the catalyst is platinum on alumina.

(References on following page)

References Cited by the Examiner

UNITED STATES PATENTS

| | | | |
|---|---|---|---|
| 2,573,149 | 10/1951 | Kassel | 208—146 |
| 2,935,464 | 5/1960 | Dudley et al. | 208—138 |
| 2,943,998 | 7/1960 | Decker | 208—65 |
| 3,058,907 | 10/1962 | Norstrand et al. | 208—138 |
| 3,091,584 | 5/1963 | Singer | 208—65 |
| 3,128,242 | 4/1964 | Bergstrom et al. | 208—65 |

DELBERT E. GANTZ, *Primary Examiner.*

ALPHONSO D. SULLIVAN, *Examiner.*

H. LEVINE, *Assistant Examiner.*